United States Patent
Fang et al.

(10) Patent No.: US 8,977,325 B2
(45) Date of Patent: Mar. 10, 2015

(54) METHOD AND SYSTEM FOR PROCESSING CELL SLEEPING

(75) Inventors: Jianmin Fang, Shenzhen (CN); Feng He, Shenzhen (CN); Yin Gao, Shenzhen (CN)

(73) Assignee: ZTE Corporation (CN)

( * ) Notice: Subject to any disclaimer, the term of this patent is extended or adjusted under 35 U.S.C. 154(b) by 228 days.

(21) Appl. No.: 13/695,144

(22) PCT Filed: Mar. 15, 2011

(86) PCT No.: PCT/CN2011/071831
§ 371 (c)(1),
(2), (4) Date: Oct. 29, 2012

(87) PCT Pub. No.: WO2011/137686
PCT Pub. Date: Nov. 10, 2011

(65) Prior Publication Data
US 2013/0053051 A1  Feb. 28, 2013

(30) Foreign Application Priority Data
May 6, 2010  (CN) .......................... 2010 1 0178115

(51) Int. Cl.
H04M 1/00 (2006.01)
H04W 52/02 (2009.01)
H04W 16/08 (2009.01)
H04W 28/08 (2009.01)

(52) U.S. Cl.
CPC .......... *H04W 52/0206* (2013.01); *H04W 28/08* (2013.01); *H04W 16/08* (2013.01)
USPC ....... 455/574; 455/344; 455/343.1; 455/63.2; 455/436; 455/450; 370/310; 370/311; 370/321; 370/328

(58) Field of Classification Search
USPC ................. 455/334, 343.1–343.5, 574, 63.2, 455/436–444, 422.1, 450–455, 464, 509; 370/310, 311, 321–337, 339, 341–348, 370/431–463
See application file for complete search history.

(56) References Cited

U.S. PATENT DOCUMENTS 8,201,078 B2 * 6/2012 Boyer et al. .................. 715/221
8,644,141 B2 * 2/2014 Gao ............................. 370/229
(Continued)

FOREIGN PATENT DOCUMENTS

CN   101594622 A   12/2009
CN   101662777 A   3/2010
(Continued)

OTHER PUBLICATIONS

PCT International Search Report in application No. PCT/CN2011/071831, dated May 6, 2010. (4 pages).
(Continued)

*Primary Examiner* — Ronald Eisner
(74) *Attorney, Agent, or Firm* — McAndrews, Held & Malloy, Ltd.

(57) ABSTRACT

The present invention provides a method and a system for processing cell sleeping. The method comprises: a cell sending a sleeping request message to a neighbor cell (S102); according to the sleeping request message, the neighbor cell sends a corresponding sleeping response message to the cell (S104); according to the sleeping response message, the cell decides to perform sleeping or not (S106). The present invention ensures the continuity of user communication.

17 Claims, 4 Drawing Sheets

(56) References Cited

U.S. PATENT DOCUMENTS

| | | | |
|---|---|---|---|
| 2004/0203832 A1* | 10/2004 | An | 455/453 |
| 2007/0206537 A1* | 9/2007 | Cam-Winget et al. | 370/331 |
| 2009/0122774 A1* | 5/2009 | Seok et al. | 370/338 |
| 2009/0285143 A1* | 11/2009 | Kwun et al. | 370/311 |
| 2010/0070562 A1* | 3/2010 | Boyer et al. | 709/203 |
| 2010/0271995 A1* | 10/2010 | Seok et al. | 370/311 |
| 2012/0039166 A1* | 2/2012 | Gao | 370/221 |
| 2012/0113882 A1* | 5/2012 | Zhao et al. | 370/311 |
| 2013/0053051 A1* | 2/2013 | Fang et al. | 455/452.1 |
| 2013/0114490 A1* | 5/2013 | Fang et al. | 370/311 |
| 2013/0128795 A1* | 5/2013 | Gao et al. | 370/311 |
| 2014/0018057 A1* | 1/2014 | Yu et al. | 455/418 |

FOREIGN PATENT DOCUMENTS

| | | |
|---|---|---|
| CN | 10196538 A | 2/2011 |
| CN | 101965038 A | 2/2011 |
| EP | 2056628 A1 | 5/2009 |
| WO | WO 2009064113 A2 * 5/2009 | ............ H04W 72/12 |

OTHER PUBLICATIONS

3GPP TR36.927 v1.1.1: Potential solutions for energy saving for E-UTRAN (Release 10), (RP-101235) Feb. 2011 section 6.2. (21 pages).

Huawei, Zte, China Unicorn, Energy Saving in UTRAN, 3GPP TSG-RAN WG3#66, R3-092786, Jeju, Korea, Nov. 9-13, 2009. (3 pages).

Communication with Supplemental European Search Report corresponding to European Patent Application No. EP11777107.

Huawei: "Overview to LTE energy saving solutions to cell switch off/on", 3GPP Draft; R3-100162, 3rd Generation Partnership Project (3GPP), Mobile Competence Centre; 650, Route Des Lucioles; F-06921 Sophia-Antipolis Cedex ; France, vol. RAN WG3, no. Valencia, Spain; 20100118, Jan. 15, 2010, XP050424028.

* cited by examiner

METHOD AND SYSTEM FOR PROCESSING CELL SLEEPING

FIELD OF THE INVENTION

The present invention relates to the communication field, and in particular to a method and a system for processing cell sleeping.

BACKGROUND OF THE INVENTION

Long Term Evolution (LTE) Network of the Third Generation Mobile Communication comprises Evolved Universal Terrestrial Radio Access Network (E-UTRAN) and Evolved Packet Core (EPC) network. The E-UTRAN comprises the set of Evolved NodeB (eNB), and the EPC comprises Mobile Management Entity (MME), Serving Gateway (S-GW), etc. The network architecture is flat. The eNB connects MME/S-GW via S1 interface, and eNBs connect with each other via X2 interface, wherein the S1 interface and the X2 interface are logical interfaces. One MME/S-GW can manage one or more eNBs, and one eNB also can be controlled by multiple MMEs/S-GWs. One eNB can manage one or more cells. LTE Advanced (LTE-A) system is evolved from LTE system which has a network architecture identical to that of LTE. The LTE-A adopts new technologies such as coordinated multi-point, frequency spectrum polymerization and Relay to enhance the system performance.

Currently, considering about energy conservation, environmental protection and cost reduction, the telecommunication operation business pays more and more attention on the energy saving issue of the wireless communication apparatus. While in wireless communication network, base stations not only have a huge amount but also consume great energy. Therefore, reducing energy consumption is the key to solve the issue of energy saving.

In practical application, the amount and the capacity of base stations are established according to the regional traffic, and traffic requirements on some peak periods will be taken into consideration for the traffic. For example, the traffic during working time is larger than that of non-working time in office areas. Therefore, the traffic within the working time will be considered when the base stations are established, and also the operation of all the base stations within the working time must be ensured to meet the requirements of traffic in the office areas.

However, during the non-working time, the traffic in office areas will apparently decrease, which will cause the surplus of wireless communication capability. In the related art, for some cells in the area with low traffic, preferable energy saving effect is generally achieved by adopting sleeping method. It should be explained that cells entering into sleeping are all capacity enhanced cells, that is to say, the cells are mainly used for providing capacity for the network. When the capacity enhanced cells enter into sleeping, the network still can ensure the continuity of coverage.

Simultaneously, some cells in the area with low traffic may be coverage enhanced cells, that is to say, the cells are mainly used for providing the coverage for the network. Preferable energy saving effect can be achieved by the sleeping of the coverage enhanced cells. However, inventors find that when the coverage enhanced cells enter into sleeping, the network may be not able to ensure the coverage of the area, and thereby the communication of users is affected.

SUMMARY OF THE INVENTION

On account of the problems of network coverage and capacity during cell sleeping, the present invention is provided. In this way, the present invention provides a method and a system for processing cell sleeping to solve above-mentioned problems.

According to one aspect of the present invention, a method for processing cell sleeping is provided.

The method for processing cell sleeping according to the present invention comprises a cell sending a sleeping request message to a neighbor cell; the neighbor cell sending a corresponding sleeping response message to the cell, according to the sleeping request message; and the cell deciding to perform a sleeping operation or not, according to the sleeping response message.

Preferably, the sleeping response message comprises a sleeping permission message and a sleeping rejection message.

Preferably, according to the sleeping request message, the process of the neighbor cell sending the corresponding sleeping response message to the cell, according to the sleeping request message comprises: when the sleeping request message carries information used for requesting the neighbor cell to compensate for a coverage area, if the neighbor cell determines that the coverage area can be compensated by the neighbor cell, the neighbor cell sending the sleeping permission message to the cell; and if the neighbor cell determines that the coverage area can not be compensated by the neighbor cell, the neighbor cell sending the sleeping rejection message to the cell.

Preferably, according to the sleeping response message, the process of the cell deciding to perform sleeping operation or not, according to the sleeping response message comprises: the cell judging that the neighbor cell sends the sleeping permission message, and deciding to perform the sleeping operation; and the cell judging that the neighbor cell sends the sleeping rejection message, and deciding not to perform the sleeping operation.

Preferably, according to the sleeping response message, the process of the cell deciding to perform sleeping operation or not according to the sleeping response message further comprises: the cell judging that a partial of the neighbor cell sends the sleeping permission message, and deciding to perform the sleeping operation or not according to methods as follows: coverage areas of a first neighbor cell and a second neighbor cell of the cell can cover a coverage area of the cell, and when the first neighbor cell or the second neighbor cell sends the sleeping permission message, the cell deciding to perform sleeping operation; or the coverage areas of the first neighbor cell and the second neighbor cell of the cell respectively cover part of the coverage area of the cell, the sum of the coverage areas of the first neighbor cell and the second neighbor cell covers the coverage area of the cell, and when the first neighbor cell or the second neighbor cell sends the sleeping rejection message, the cell deciding not to perform sleeping operation.

Preferably, after the cell decides to perform sleeping operation according to the sleeping response message, the method further comprises: the cell sending a message for indicating compensation of a coverage area to the neighbor cell; and the neighbor cell performing a compensation operation of the coverage area.

Preferably, after the neighbor cell performs the compensation operation of the coverage area, the method further comprises: if the neighbor cell judges that the compensation operation of the coverage area is successful, the neighbor cell returning a coverage area compensation successful message to the cell; otherwise, the neighbor cell returning a coverage area compensation unsuccessful message.

Preferably, the sleeping operation comprises one of the followings: sleeping entering operation and sleeping exiting operation; wherein, for the sleeping entering operation, the cell carries information for requesting the neighbor cell to perform coverage area compensation in the sleeping request message; and for the sleeping exiting operation, the cell carries information for requesting the neighbor cell to cancel coverage area compensation in the sleeping request message.

Preferably, the cell and the neighbor cell comprise one of the followings: a macro base station cell and a home base station cell; the sleeping request message carries at least one of the following information: a cell identifier, a neighbor cell identifier, an indication for indicating the neighbor cell to perform coverage area compensation, and an indication for indicating the neighbor cell to cancel coverage area compensation; the sleeping permission message carries at least one of the following information: a cell identifier and a neighbor cell identifier; the sleeping rejection message carries at least one of the following information: a cell identifier, a neighbor cell identifier and a rejection reason.

According to another aspect of the present invention, a system for processing cell sleeping is provided.

The system for processing cell sleeping according to the present invention comprises a cell and a neighbor cell, wherein the cell comprises a first sending module, which is configured to send a sleeping request message to the neighbor cell; the neighbor cell comprises a second sending module, which is configured to send a corresponding sleeping response message to the cell according to the sleeping request message; and the cell further comprises a determining module, which is configured to decide to perform a sleeping operation or not according to the sleeping response message.

Preferably, the second sending module comprises: a judgment sub-module, configured to judge to compensate a coverage area or not when the sleeping request message carries information for requesting the neighbor cell to perform coverage area compensation; and a sending sub-module, configured to send a sleeping permission message or a sleeping rejection message to the cell.

Preferably, the determining module comprises: a first determining sub-module, configured to decide to perform the sleeping operation; and a second determining sub-module, configured to decide not to perform the sleeping operation.

By the present invention, the neighbor cell sends the corresponding sleeping response message to the cell, so that the cell can decide whether to perform the sleeping operation or not according to the sleeping response message, which solves the problems of network coverage and capacity during cell sleeping, and thereby the user communication is ensured.

BRIEF DESCRIPTION OF THE DRAWINGS

The drawings illustrated here provide a further understanding of the present invention and constitute a part of the application. The exemplary embodiments of the present invention and the description thereof are used to explain the present invention without unduly limiting the scope of the present invention, wherein.

DETAILED DESCRIPTION OF EMBODIMENTS

It shall be understood that the embodiments of the present application and the features of the embodiments can be combined with each other if there is no conflict. The present invention will be detailed hereinafter with reference to the drawings and in connection with the embodiments.

The embodiments below of the present invention are based on the network composed of a cell and multiple neighbor cells of 3GPP.

Figure 1:
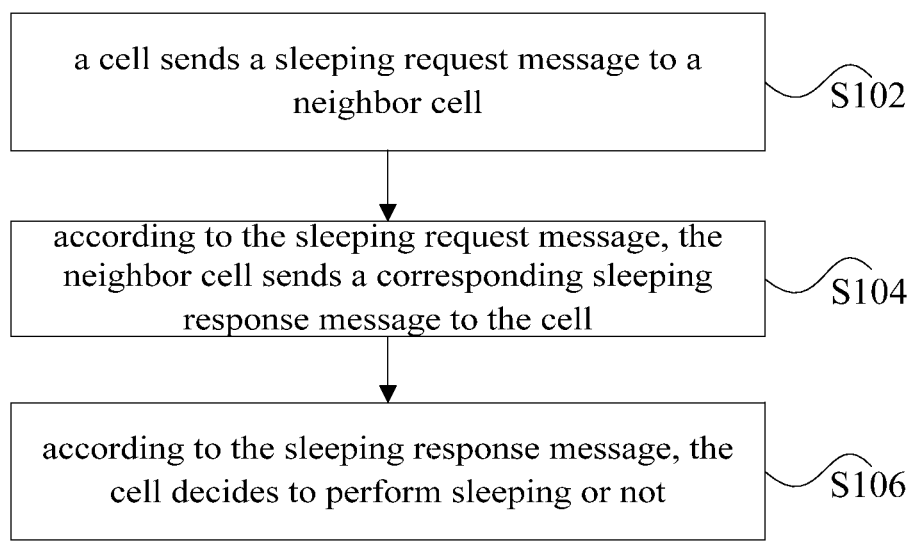
FIG. 1 is a flow chart of a method for processing cell sleeping according to one embodiment of the present invention.

FIG. 1 is a flow chart of a method for processing cell sleeping according to one embodiment of the present invention, which comprises the steps as follows.

Step S102, a cell sends a sleeping request message to a neighbor cell.

Step S104, according to the sleeping request message, the neighbor cell sends a corresponding sleeping response message to the cell.

Step S106, according to the sleeping response message, the cell decides to perform a sleeping operation or not.

In the related art, the coverage quality of the network area cannot be ensured while performing cell sleeping. In the embodiment, according to the sleeping response message sent by the neighbor cell to the cell, the cell can learn whether the neighbor cell can regulate the coverage area or not, and then the cell decides to perform sleeping or not according to the sleeping response message, which can avoid the repetition or fracture of network coverage area when the cell performs sleeping and the neighbor cell cannot regulate the coverage area, and thereby not only the purpose of energy saving is achieved, but also the user communication is ensured.

Preferably, the cell is a coverage enhanced cell, and mainly provides the coverage for the network.

Preferably, the sleeping response message comprises a sleeping permission message and a sleeping rejection message. When the sleeping request message carries the message used for requesting the neighbor cell to compensate for coverage area, if the neighbor cell determines that the coverage area can be compensated, then the neighbor cell sends the sleeping permission message to the cell, otherwise the neighbor cell sends the sleeping rejection message to the cell.

By the sleeping permission message or the sleeping rejection message sent by the neighbor cell to the cell, the cell can learn whether the neighbor cell can compensate the coverage area or not, and then the cell decides to perform sleeping or not according to the sleeping response message, which can avoid the repetition or fracture of network coverage area when the cell performs sleeping and the neighbor cell cannot regulate the coverage area, and thereby not only the purpose of energy saving is achieved, but also the user communication is ensured.

Preferably, the step of the cell deciding to perform the sleeping operation or not according to the sleeping response message comprises the situations as follows.

(1) The cell determines that the message sent by the neighbor cell is a sleeping permission message, and decides to perform the sleeping operation.

(2) The cell determines that the message sent by the neighbor cell is a sleeping rejection message, and decides not to perform the sleeping operation.

What should be explained is that the number of the neighbor cell is one or multiple.

When the cell just sends the sleeping request message to one neighbor cell and if the neighbor cell sends the sleeping permission message, the cell can decide to perform the sleeping operation. If the neighbor cell sends the sleeping rejection message, then the cell decides not to perform the sleeping operation.

When the cell sends the sleeping request message to multiple neighbor cells and if all neighbor cells send the sleeping permission message, the cell can decide to perform the sleeping operation. If all neighbor cells send the sleeping rejection message, then the cell decides not to perform the sleeping operation.

(3) When the cell sends the sleeping request message to multiple neighbor cells, the cell determines that some neighbor cells send the sleeping permission message, and some neighbor cells send the sleeping rejection message, and then it is decided whether to perform the sleeping operation or not according to the methods as follows.

The coverage areas of a first neighbor cell and a second neighbor cell of the cell can cover the coverage area of the cell, and when the first neighbor cell or the second neighbor cell sends the sleeping permission message, the cell decides to perform the sleeping operation.

The coverage areas of the first neighbor cell and the second neighbor cell of the cell respectively cover part of the coverage area of the cell, and the sum of the coverage areas of the first neighbor cell and the second neighbor cell covers the coverage area of the cell. When the first neighbor cell or the second neighbor cell sends the sleeping rejection message, the cell decides not to perform the sleeping operation.

It should be explained that after the cell sends the sleeping request message to the neighbor cell, if the sleeping response message from the first neighbor cell is the sleeping rejection message, the cell is unnecessary to wait for the sleeping response message to be sent from the second neighbor cell, but directly decides not to perform the sleeping operation.

It should be explained is that the above-mentioned first neighbor cell and second neighbor cell are just an example of the preferable embodiment of the present invention, while in practical application, more neighbor cells may be included, and the coverage relationship of which may be more complicated. However, the situation can be deemed as the complex or the superposition of the above-mentioned first neighbor cell and second neighbor cell.

Preferably, in Step S102, the cell sends a sleeping request message, which can be decided by the cell itself, or can be triggered by a neighbor cell. When the decision is triggered by a neighbor cell, before Step S102, the step of the neighbor cell sending the sleeping request message to the cell is further comprised, namely, the neighbor cell requires the cell to perform the sleeping operation. Meanwhile, when forwarding the sleeping request message, the cell cannot send the sleeping request message to the neighbor cell. In this way, the step of the cell performing sleeping can be saved, and therefore the process is accelerated.

Preferably, after the cell decides to perform the sleeping operation according to the sleeping response message, the cell sends a message for indicating the compensation of coverage area to the neighbor cell; and the neighbor cell performs the compensation of coverage area.

It should be explained that by the preferable embodiment of the present invention, after the neighbor cell sends the sleeping permission message or the sleeping rejection message, the neighbor cell can learn whether the cell perform the sleeping operation or not, and thereby the corresponding compensation can be performed according to the sleeping operation, and the user communication can be ensured.

Preferably, after the neighbor cell performs the compensation of coverage area, if the neighbor cell determines that the compensation of coverage area is successful, the neighbor cell returns a coverage area compensation successful message to the cell; otherwise, the neighbor cell returns a coverage area compensation unsuccessful message.

It should be explained that by the preferable embodiment of the present invention, after the cell notices the neighbor cell to compensate the coverage area, the cell can learn whether the neighbor perform the corresponding compensation or not, and thereby the user communication is ensured.

Preferably, the sleeping comprises sleeping entering operation and sleeping exiting operation, wherein, for the sleeping entering operation, the cell carries a message for requesting the neighbor cell to perform coverage area compensation in the sleeping request message; and for the sleeping exiting operation, the cell carries a message for requesting the neighbor cell to narrow down coverage compensation (namely, cancel coverage area compensation) in the sleeping request message.

It should be explained that when the cell enters sleeping, the neighbor cell needs to expand coverage area to compensate the coverage area of the cell, and thereby the fracture of network coverage area is avoided. When the cell exits sleeping, the neighbor cell needs to narrows down the coverage area to avoid the interference of the cell.

Preferably, the cell and the neighbor cell can be a macro base station cell or a home base station cell.

Preferably, the above-mentioned cell and neighbor cell can belong to a same system, such as Intra-RAT or LTE/LTE-A. The above-mentioned cell and neighbor cell can also belong to different systems, for example, they belong to GSM or UMTS or LTE/LTE-A respectively.

Preferably, the above-mentioned sleeping request message, sleeping permission message and sleeping rejection message in the LTE/LTE-A system can be realized by X2, S1 interface messages between macro base stations, and can be realized by S1 interface messages between the macro base station and the home base station or between home base stations.

Preferably, the above-mentioned sleeping request message, sleeping permission message and sleeping rejection message in the UMTS system can be realized by Iub, Iur, Iu interface messages between macro base stations, and can be realized by Iuh, Iub, Iu interface messages between the macro base station and the home base station or between home base stations.

Preferably, the above-mentioned sleeping request message carries one or multiple of the following information: a cell identifier, a neighbor cell identifier, an indication for indicating the neighbor cell to perform coverage area compensation or not (which can be carried when the cell is sleeping), or an indication for indicating the neighbor cell to cancel coverage area compensation or not (which can be carried when the cell exits sleeping).

Preferably, the above-mentioned sleeping permission message carries one or multiple of the following information: a cell identifier and a neighbor cell identifier.

Preferably, the above-mentioned sleeping rejection message carries one or multiple of the following information: a cell identifier, a neighbor cell identifier and a rejection reason, wherein the reason for rejecting the cell entering sleeping may be the demand for capacity, the incapability of the neighbor cell to provide coverage compensation, etc; and the reason for rejecting the cell exiting sleeping may be non-demand of capacity, the incapability of the neighbor cell to cancel coverage compensation, the possibility of interfering the neighbor cell, etc.

Preferably, when the cell sends the sleeping request message to the neighbor cell, a timer can be set. If all the sleeping response messages are not received after the timer expires, and the decision for performing sleeping or not cannot be made according to the received sleeping response messages, the sleeping request messages can be resent to the neighbor cells which do not send the sleeping response messages yet or to all neighbor cells.

Preferably, after the cell sends the sleeping request message to the neighbor cell, if the decision for performing sleeping or not can be made according to the received response messages, the sleeping can be directly performed without waiting for the sleeping response messages which are not received yet.

The implementation process for the above-mentioned embodiments will be detailed hereinafter in conjunction with the preferable embodiments and the drawings of the present invention.

Preferable Embodiment I

In Preferable Embodiment I, the neighbor cell can determine to expand the coverage area to compensate while the cell is sleeping, and therefore the neighbor cell sends the sleeping entering permission message to the cell so that the cell can enter sleeping according to the sleeping entering permission message.

Figure 2:
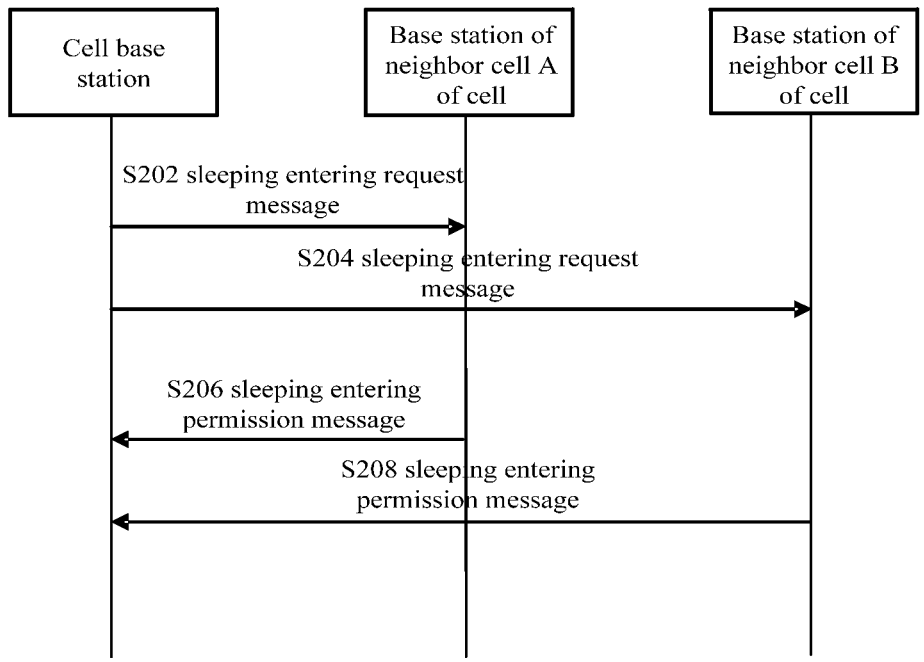
FIG. 2 is a flow chart of successful entering of sleeping according to Preferable Embodiment I of the present invention.
Figure 3:
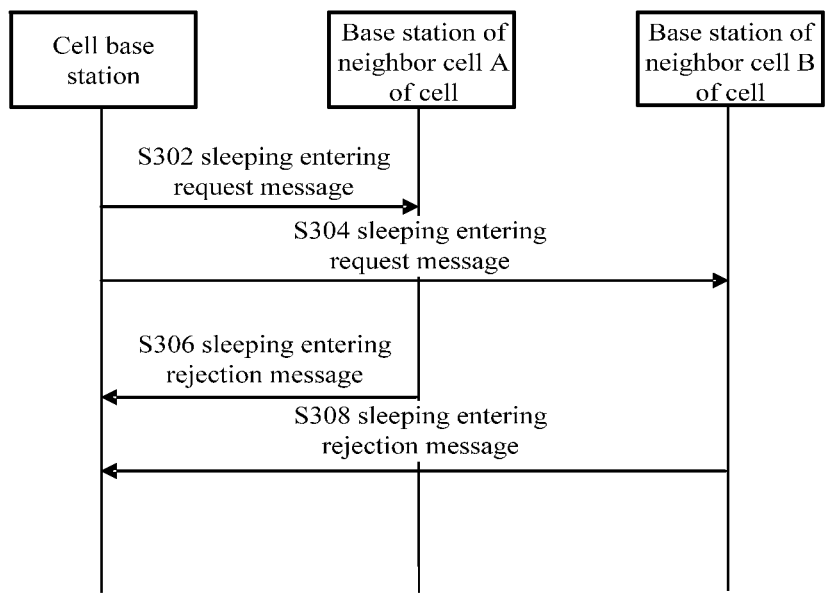
FIG. 3 is a flow chart of unsuccessful entering of sleeping according to Preferable Embodiment II of the present invention.

FIG. 2 is a flow chart of successful entering of sleeping according to Preferable Embodiment I of the present invention, which comprises the steps as follows.

Step S202, the cell sends a sleeping entering request message to a base station of the neighbor cell A.

Step S204, the cell sends a sleeping entering request message to a base station of the neighbor cell B.

It should be explained that when the cell decides to enter sleeping or receives the sleeping entering request message (the neighbor cell requires the cell to enter sleeping) from a certain neighbor cell (such as the neighbor cell A), the cell firstly sends the sleeping request message to the relevant neighbor cell. In the above, the relevant neighbor cell can be the neighbor cell of which the coverage area can comprise the coverage area of the cell, the neighbor cell of which the coverage area partially overlaps with the coverage area of the cell, the neighbor cell of which the expanded coverage area can compensate the coverage area of the cell while the cell is sleeping, etc.

Preferably, the number of the relevant neighbor cell can be one or multiple. Meanwhile, for the situation that the cell receives the sleeping entering request message of the neighbor cell A, the relevant neighbor cell cannot comprise the neighbor cell A.

Preferably, the sleeping entering request message sent by the cell can carry one or multiple of the following messages: a cell identifier, a neighbor cell identifier, an indication for indicating the neighbor cell to perform coverage area compensation or not (the indication can be carried when the neighbor cell is needed to expand the coverage area to compensate the coverage area of the cell while the cell is sleeping).

Step S206, the neighbor A sends the sleeping entering permission message to the cell.

Step S208, the neighbor B sends the sleeping entering permission message to the cell.

It should be explained that for each neighbor cell which receives the sleeping entering request message sent by the cell, if the sleeping entering request message carries the indication that the coverage compensation from the neighbor cell is needed, the neighbor cell determines to send the sleeping entering permission message to the cell or not mainly according to whether the neighbor cell can expand the coverage area to compensate while the cell is sleeping or not. If the sleeping entering request message does not carry the indication that the coverage compensation from the neighbor cell is needed, the neighbor cell determines to send the sleeping entering permission message to the cell or not mainly according to whether the capacity of the cell can significantly affect the neighbor cell or not while the cell is sleeping.

In this preferable embodiment, the neighbor cell determines that the neighbor cell can expand the coverage area to compensate while the cell is sleeping, and therefore the neighbor cell sends the sleeping entering permission message to the cell so that the cell can enter sleeping according to the sleeping entering permission message.

Preferable Embodiment II

In Preferable Embodiment II, the neighbor cell determines that the capacity of the cell can significantly affect the neighbor cell while the cell is sleeping, and therefore the neighbor cell sends the sleeping entering rejection message to the cell so that the cell cannot enter sleeping according to the sleeping entering rejection message.

Step S302 to Step S304 are the same as Step S202 to Step S204.

Step S306, the neighbor cell A sends the sleeping entering rejection message to the cell.

Step S308, the neighbor cell B sends the sleeping entering rejection message to the cell.

For each neighbor cell which receives the sleeping request message from the cell, the neighbor cell determines to send the rejection message or not to the cell (in case the capacity of the cell can significantly affect the neighbor cell) according to whether the capacity of the cell can significantly affect the neighbor cell or not while the cell is sleeping (for example, the load of the neighbor cell is much high, and the cell has a certain load currently. If the cell enters sleeping, the load of the cell may transfer to the neighbor cell and probably makes the neighbor cell overload).

In Preferable Embodiment II, the neighbor cell determines that the capacity of the cell can significantly affect the neighbor cell while the cell is sleeping, and therefore the neighbor cell sends the sleeping entering rejection message to the cell so that the cell cannot enter sleeping according to the sleeping entering rejection message. Preferably, the rejection message can carry the reason, such as capacity demand, etc.

Preferable Embodiment III

In Preferable Embodiment III, the neighbor cell determines that the neighbor cell can narrow down coverage area thereof to the normal state, and therefore the neighbor cell sends the sleeping exiting permission message to the cell so that the cell can exit sleeping according to the sleeping exiting permission message.

Figure 4:
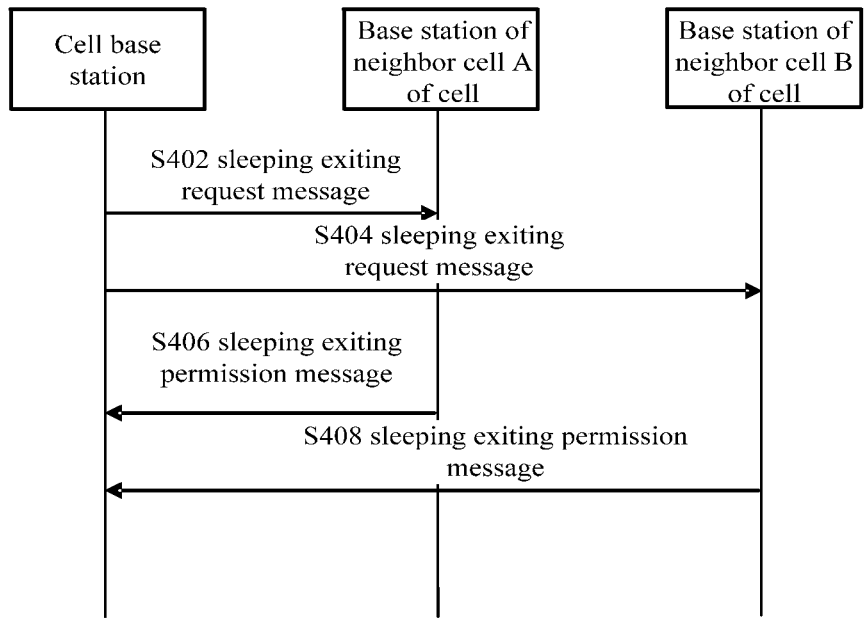
FIG. 4 is a flow chart of successful exiting of sleeping according to Preferable Embodiment III of the present invention.
Figure 5:
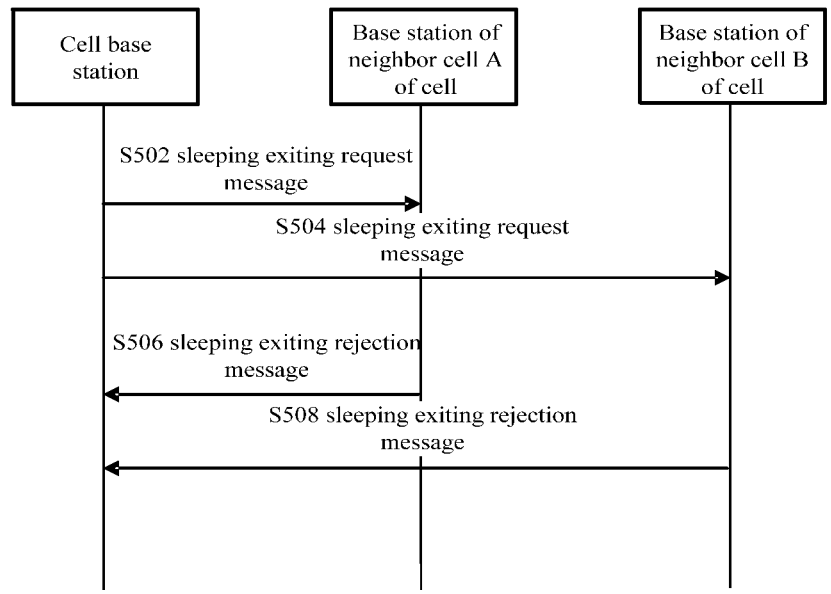
FIG. 5 is a flow chart of unsuccessful exiting of sleeping according to Preferable Embodiment IV of the present invention.

FIG. 4 is a flow chart of successful exiting of sleeping according to Preferable Embodiment III of the present invention, which comprises the steps as follows.

Step S402, the cell sends the sleeping exiting request message to a base station of the neighbor cell A.

Step S404, the cell sends the sleeping exiting request message to a base station of the neighbor cell B.

It should be explained that when the cell decides to exit sleeping or receives the sleeping exiting request message (the neighbor cell requires to activate the cell in sleeping) from a certain neighbor cell (such as the neighbor cell A), the cell firstly sends the sleeping exiting permission request message to the relevant neighbor cell. In the above, the relevant neighbor cell can be the neighbor cell of which the coverage area can comprise the coverage area of the cell, the neighbor cell of which the coverage area partially overlaps with the coverage area of the cell, and the neighbor cell which needs to narrow down the coverage area to avoid the significant interference with the cell when the cell exits sleeping.

Preferably, the number of the relevant neighbor cell can be one or multiple. Meanwhile, for the situation that the cell receives the sleeping exiting request message of the neighbor cell A, the relevant neighbor cell cannot comprise the neighbor cell A.

Preferably, the sleeping exiting request message sent by the cell can carry one or multiple of the following information: a cell identifier, a neighbor cell identifier, an indication for indicating the neighbor cell to cancel coverage area compensation or not (the indication can be carried when the neighbor cell is needed to narrow down the coverage area to avoid the significant interference with the cell while the cell exits sleeping).

Step S406, the neighbor A sends the sleeping exiting permission message to the cell.

Step S408, the neighbor B sends the sleeping exiting permission message to the cell.

It should be explained that for each neighbor cell which receives the sleeping exiting request message sent by the cell, if the request message carries the indication that it is required to cancel the coverage compensation by the neighbor cell, the neighbor cell determines to send the sleeping exiting permission message to the cell or not mainly according to whether the neighbor cell can narrow down the coverage area to the normal state or not. If the request message does not carry the indication that it is required to cancel the coverage compensation by the neighbor cell, the neighbor cell determines to send the permission message to the cell or not mainly according to whether to activate the cell or not when considering the capacity.

In this preferable embodiment, the neighbor cell determines that the neighbor cell can narrow down the coverage area thereof to the normal state, and therefore the neighbor cell sends the sleeping exiting permission message to the cell so that the cell can exit sleeping according to the sleeping exiting permission message.

Preferable Embodiment IV

In Preferable Embodiment IV, the neighbor cell determines that the cell can significantly interfere with the neighbor cell when the cell is activated, and therefore the neighbor cell sends the sleeping exiting rejection message to the cell so that the cell does not exit sleeping according to the sleeping exiting rejection message.

Step S502 to step S504 are the same as step S402 to step S404.

Step S506, the neighbor cell A sends the sleeping exiting rejection message to the cell.

Step S508, the neighbor cell B sends the sleeping exiting rejection message to the cell.

For each neighbor cell which receives the sleeping exiting permission request message from the cell, the neighbor cell determines to send the rejection message (when the neighbor cell considers that significant interference can be caused when the cell is activated) to the cell or not mainly according to the capacity to consider activate the cell or not, and whether the neighbor cell can be significantly interfered or not when the cell is activated.

In Preferable Embodiment IV, the neighbor cell determines that the cell can significantly interfere with the neighbor cell when the cell is activated, and therefore the neighbor cell sends the sleeping exiting rejection message to the cell so that the cell does not exit sleeping according to the sleeping exiting rejection message. Preferably, the rejection message can carry the reason such as the possible significant interference to the neighbor cell, etc.

Figure 6:
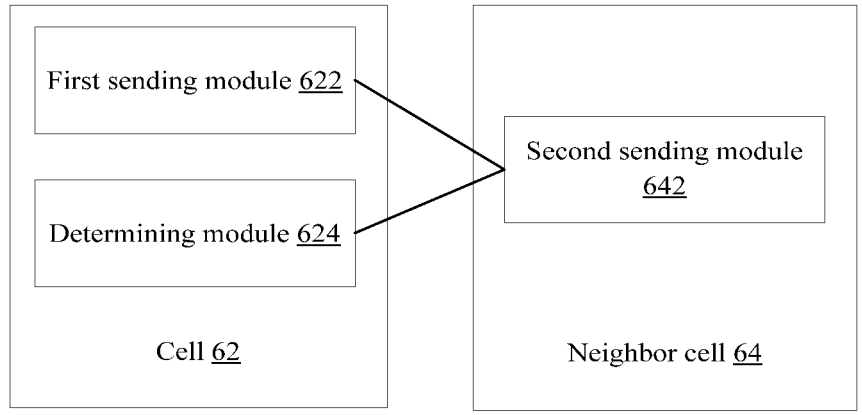
FIG. 6 is a structural block diagram of a system for processing cell sleeping according to one embodiment of the present invention.

A system for processing cell sleeping is provided according to the embodiments of the present invention, and the system can be used for realizing the processing method of the above-mentioned cell sleeping. FIG. 6 is a structural block diagram of a system for processing cell sleeping according to one embodiment of the present invention. As shown in FIG. 6, the system comprises: a cell 62 and a neighbor cell 64, wherein the cell 62 comprises a first sending module 622 and a determining module 624, and the neighbor cell 64 comprises a second sending module 642.

The first sending module 622 is configured to send a sleeping request message to the neighbor cell. The second sending module 642 is connected with the first sending module 622, and is configured to send a corresponding sleeping response message to the cell according to the sleeping request message sent by the first sending module 622. The determining module 624 is connected with the second sending module 642, and is configured to decide to perform a sleeping operation or not according to the sleeping response message sent by the second sending module 642.

In the related art, the coverage of the network area cannot be ensured while the cell is sleeping. In this embodiment, by the sleeping response message sent by the second sending module 642 to the cell, the cell can learn whether the neighbor cell can regulate the coverage area or not, and then the cell decides to perform the sleeping operation or not according to the sleeping response message via the decision module 624, which can avoid the repetition or fracture of the network coverage area when the cell performs the sleeping operation and the neighbor cell cannot regulate the coverage area, and thereby not only the purpose of energy saving is achieved, but also the user communication is ensured.

Figure 7:
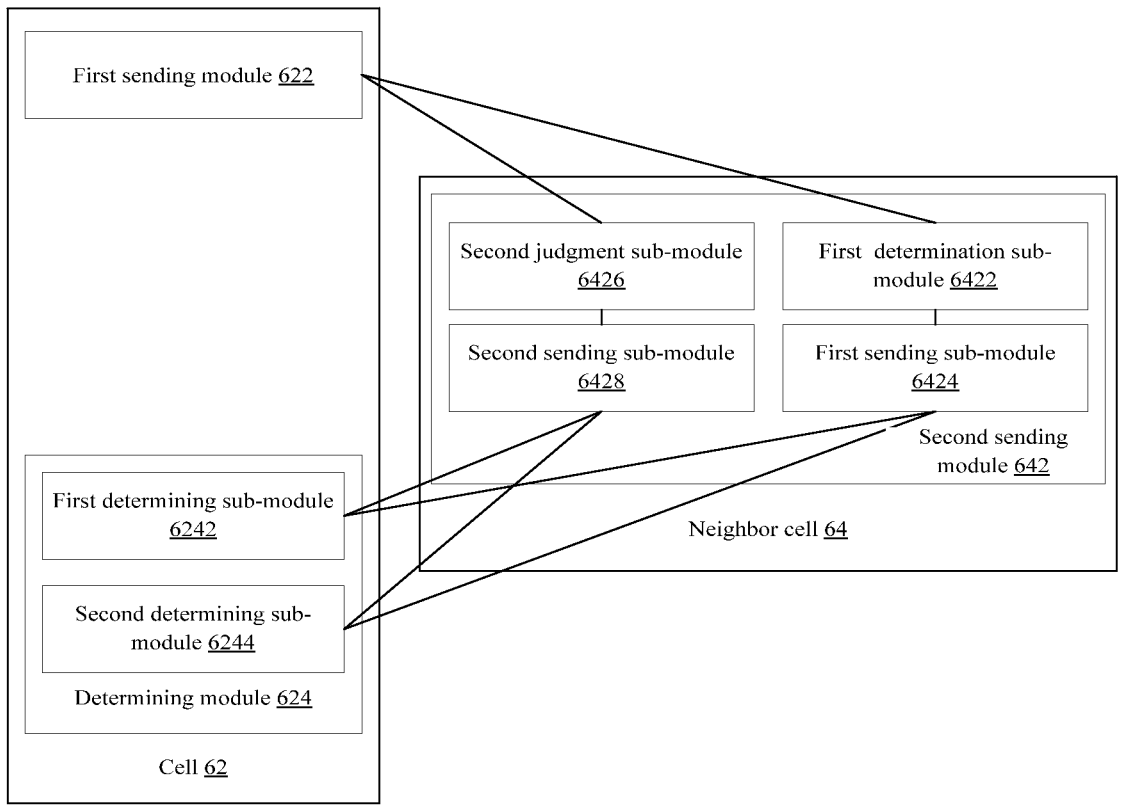
FIG. 7 is a structural block diagram of a system for processing cell sleeping according to one preferable embodiment of the present invention.

FIG. 7 is a structural block diagram of a system for processing cell sleeping according to one preferable embodiment of the present invention. The second sending module 642 comprises a judgment sub-module 6422, and a sending sub-module 6424. The determining module 624 comprises a first determining sub-module 6242 and a second determining sub-module 6244.

The judgment sub-module 6422 is connected with the first sending module 622, and is configured to judge whether to compensate coverage area or not when the sleeping request message sent by the first sending module 622 carries information for requesting the neighbor cell to perform coverage area compensation; and the sending sub-module 6424 is connected with the judgment sub-module 6422, and is configured to send a sleeping permission message or a sleeping rejection message to the cell according to the compensation coverage area judged by the judgment sub-module 6422.

The first determining module 6242 is connected with the first sending sub-module 6424 and the second sending sub-module 6428, and is configured to decide to perform sleeping according to the sleeping permission message sent by the first sending sub-module 6424 and the sleeping rejection message sent by the second sending sub-module 6248. The second determining sub-module 6244 is connected with the first sending sub-module 6424 and the second sending sub-module 6428, and is configured to decide not to perform the sleeping operation according to the sleeping permission message sent by the first sending sub-module 6424 and the sleeping rejection message sent by the second sending sub-module 6428.

To sum up, a method and a system for processing cell sleeping are provided according to the above-mentioned embodiments of the present invention. By the sleeping response message sent by the neighbor cell to the cell, the cell can decide to perform the sleeping operation or not according to the sleeping response message, which solves the problem about the repetition or fracture of the network coverage area while the cell is sleeping, and furthermore the user communication is ensured.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the step of the present invention can be realized by using the executable program code of the calculating device. Consequently, the modules and the steps can be stored in the storage device and executed by the calculating device, or the modules and the steps are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the protection scope of the present invention.

What is claimed is:

1. A method for processing cell sleeping, comprising:
a cell sending a sleeping request message to a neighbor cell of the cell;
the neighbor cell sending a corresponding sleeping response message to the cell, according to the sleeping request message;
the cell deciding to perform a sleeping operation or not, according to the sleeping response message;
wherein the sleeping response message comprises a sleeping permission message and a sleeping rejection message;
the process of the neighbor cell sending the corresponding sleeping response message to the cell, according to the sleeping request message comprises:
when the sleeping request message carries information used for requesting the neighbor cell to compensate for a coverage area,
if the neighbor cell determines that the coverage area can be compensated by the neighbor cell, the neighbor cell sending the sleeping permission message to the cell; and
if the neighbor cell determines that the coverage area can not be compensated by the neighbor cell, the neighbor cell sending the sleeping rejection message to the cell.

2. The method according to claim 1, wherein the process of the cell deciding to perform sleeping operation or not, according to the sleeping response message comprises: the cell judging that the neighbor cell sends the sleeping permission message, and deciding to perform the sleeping operation; and the cell judging that the neighbor cell sends the sleeping reject message, and deciding not to perform the sleeping operation.

3. The method according to claim 1, wherein the process of the cell deciding to perform sleeping operation or not according to the sleeping response message further comprises: the cell judging that part of the neighbor cells send cell sends the sleeping permission message, and deciding to perform the sleeping operation or not according to methods as follows: coverage areas of a first neighbor cell of the cell and a second neighbor cell of the cell can cover a coverage area of the cell, and when the first neighbor cell or the second neighbor cell sends the sleeping permission message, the cell deciding to perform sleeping operation; or the coverage areas of the first neighbor cell and the second neighbor cell of the cell respectively cover part of the coverage area of the cell, the combined area of the coverage areas of the first neighbor cell and the second neighbor cell covers the coverage area of the cell, and when the first neighbor cell or the second neighbor cell sends the sleeping rejection message, the cell deciding not to perform sleeping operation.

4. The method according to claim 1, wherein after the cell decides to perform sleeping operation according to the sleeping response message, the method further comprises:
the cell sending a message for indicating compensation of a coverage area to the neighbor cell; and
the neighbor cell performing a compensation operation of the coverage area.

5. The method according to claim 4, wherein after the neighbor cell performs the compensation operation of the coverage area, the method further comprises:
if the neighbor cell judges that the compensation operation of the coverage area is successful, the neighbor cell returning a coverage area compensation successful message to the cell; otherwise, the neighbor cell returning a coverage area compensation unsuccessful message.

6. The method according to any one of claim 1, wherein the sleeping operation comprises one of the following: sleeping entering operation and sleeping exiting operation; wherein, for the sleeping entering operation, the cell carries information for requesting the neighbor cell to perform coverage area compensation in the sleeping request message; and for the sleeping exiting operation, the cell carries information for requesting the neighbor cell to cancel coverage area compensation in the sleeping request message.

7. The method according to claim 1, wherein,
the cell and the neighbor cell comprise one of the following: a macro base station cell and a home base station cell;
the sleeping request message carries at least one of the following information: a cell identifier, a neighbor cell identifier, an indication for indicating the neighbor cell to perform coverage area compensation, and an indication for indicating the neighbor cell to cancel coverage area compensation;
the sleeping permission message carries at least one of the following information: a cell identifier and a neighbor cell identifier;
the sleeping rejection message carries at least one of the following information: a cell identifier, a neighbor cell identifier and a rejection reason.

8. A system for processing cell sleeping, comprising a cell and a neighbor cell, wherein
the cell comprises a first sending module, which is configured to send a sleeping request message to the neighbor cell of the cell;

the neighbor cell comprises a second sending module, which is configured to send a corresponding sleeping response message to the cell according to the sleeping request message; and the cell further comprises a determining module, which is configured to decide to perform a sleeping operation or not according to the sleeping response message;

wherein the second sending module comprises:

a judgment sub-module, configured to judge to compensate a coverage area or not when the sleeping request message carries information for requesting the neighbor cell to perform coverage area compensation; and a sending sub-module, configured to send the sleeping permission message to the cell, if the judgment sub-module determines that the coverage area can be compensated by the neighbor cell; and send the sleeping rejection message to the cell, if the judgment sub-module determines that the coverage area can not be compensated by the neighbor cell.

9. The system according to claim 8, wherein the determining module comprises: a first determining sub-module, configured to decide to perform the sleeping operation; and a second determining sub-module, configured to decide not to perform the sleeping operation.

10. The method according to claim 1, wherein the sleeping operation comprises one of the following: sleeping entering operation and sleeping exiting operation; wherein, for the sleeping entering operation, the cell carries information for requesting the neighbor cell to perform coverage area compensation in the sleeping request message; and for the sleeping exiting operation, the cell carries information for requesting the neighbor cell to cancel coverage area compensation in the sleeping request message.

11. The method according to claim 1, wherein the sleeping operation comprises one of the following: sleeping entering operation and sleeping exiting operation; wherein, for the sleeping entering operation, the cell carries information for requesting the neighbor cell to perform coverage area compensation in the sleeping request message; and for the sleeping exiting operation, the cell carries information for requesting the neighbor cell to cancel coverage area compensation in the sleeping request message.

12. The method according to claim 2, wherein the sleeping operation comprises one of the following:

sleeping entering operation and sleeping exiting operation; wherein, for the sleeping entering operation, the cell carries information for requesting the neighbor cell to perform coverage area compensation in the sleeping request message; and for the sleeping exiting operation, the cell carries information for requesting the neighbor cell to cancel coverage area compensation in the sleeping request message.

13. The method according to claim 4, wherein the sleeping operation comprises one of the following:

sleeping entering operation and sleeping exiting operation; wherein, for the sleeping entering operation, the cell carries information for requesting the neighbor cell to perform coverage area compensation in the sleeping request message; and for the sleeping exiting operation, the cell carries information for requesting the neighbor cell to cancel coverage area compensation in the sleeping request message.

14. The method according to claim 1, wherein, the cell and the neighbor cell comprise one of the following: a macro base station cell and a home base station cell; the sleeping request message carries at least one of the following information: a cell identifier, a neighbor cell identifier, an indication for indicating the neighbor cell to perform coverage area compensation, and an indication for indicating the neighbor cell to cancel coverage area compensation; the sleeping permission message carries at least one of the following information: a cell identifier and a neighbor cell identifier; the sleeping rejection message carries at least one of the following information: a cell identifier, a neighbor cell identifier and a rejection reason.

15. The method according to claim 1, wherein, the cell and the neighbor cell comprise one of the following: a macro base station cell and a home base station cell; the sleeping request message carries at least one of the following information: a cell identifier, a neighbor cell identifier, an indication for indicating the neighbor cell to perform coverage area compensation, and an indication for indicating the neighbor cell to cancel coverage area compensation; the sleeping permission message carries at least one of the following information: a cell identifier and a neighbor cell identifier; the sleeping rejection message carries at least one of the following information: a cell identifier, a neighbor cell identifier and a rejection reason.

16. The method according to claim 2, wherein, the cell and the neighbor cell comprise one of the following: a macro base station cell and a home base station cell;

the sleeping request message carries at least one of the following information: a cell identifier, a neighbor cell identifier, an indication for indicating the neighbor cell to perform coverage area compensation, and an indication for indicating the neighbor cell to cancel coverage area compensation;

the sleeping permission message carries at least one of the following information: a cell identifier and a neighbor cell identifier;

the sleeping rejection message carries at least one of the following information: a cell identifier, a neighbor cell identifier and a rejection reason.

17. The method according to claim 4, wherein, the cell and the neighbor cell comprise one of the following: a macro base station cell and a home base station cell;

the sleeping request message carries at least one of the following information: a cell identifier, a neighbor cell identifier, an indication for indicating the neighbor cell to perform coverage area compensation, and an indication for indicating the neighbor cell to cancel coverage area compensation;

the sleeping permission message carries at least one of the following information: a cell identifier and a neighbor cell identifier;

the sleeping rejection message carries at least one of the following information: a cell identifier, a neighbor cell identifier and a rejection reason.

* * * * *